United States Patent [19]
Gervasoni et al.

[11] Patent Number: 5,626,381
[45] Date of Patent: May 6, 1997

[54] SUN-VISOR FOR MOTOR VEHICLES

[75] Inventors: Pascal Gervasoni, Carling; René Lecorvaisier, Hombourg-Haut; Patrick Sauder, Folochviller; Didier Weiss, Guerting, all of France

[73] Assignee: Gebr. Happich GmbH, Germany

[21] Appl. No.: 599,046

[22] Filed: Feb. 9, 1996

[30] Foreign Application Priority Data

Feb. 9, 1995 [DE] Germany ............. 195 04 248.4

[51] Int. Cl.⁶ ............................................. B60J 3/00
[52] U.S. Cl. ........................... 296/97.8; 296/97.6
[58] Field of Search ................... 296/97.6, 97.8, 296/97.9, 97.4, 97.1

[56] References Cited

U.S. PATENT DOCUMENTS

| | | | |
|---|---|---|---|
| 1,552,199 | 9/1925 | Beckman | 296/97.9 X |
| 1,666,568 | 4/1928 | Jackson | 296/97.9 X |
| 2,596,873 | 5/1952 | Solmes | 296/97.8 |
| 3,095,233 | 6/1963 | Dryden | 296/97.6 |
| 3,191,986 | 6/1965 | Simon | 296/97.8 |
| 4,580,829 | 4/1986 | Matheopoulos | 296/97.6 |
| 4,913,483 | 4/1990 | Jasso | 296/97.6 |

FOREIGN PATENT DOCUMENTS

| | | |
|---|---|---|
| 8110470 | 7/1981 | Germany . |
| 4210644 | 7/1993 | Germany . |
| 2173461 | 10/1986 | United Kingdom ........... 296/97.6 |

OTHER PUBLICATIONS

Patent Abstracts of Japan, No. 62-184925 (A), Jan. 29, 1988, vol. 12, No. 31.

*Primary Examiner*—Joseph D. Pape
*Attorney, Agent, or Firm*—Ostrolenk, Faber, Gerb & Soffen, LLP

[57] ABSTRACT

A sun-visor for motor vehicles is described which has a flat, elongated sun-visor body which can be flipped from a position of non-use above a vehicle windshield into a position of use in front of the vehicle windshield. The sun-visor body carries a plate at one end region of its lengthwise direction. The plate can be swung out around a hinge on the visor body when the sun-visor body is in its position of use in order to impart the sun-visor body the normal size which protects against glare and can be swung inward in order to shorten the length of the sun-visor body before it is swung into the position of non-use.

15 Claims, 2 Drawing Sheets

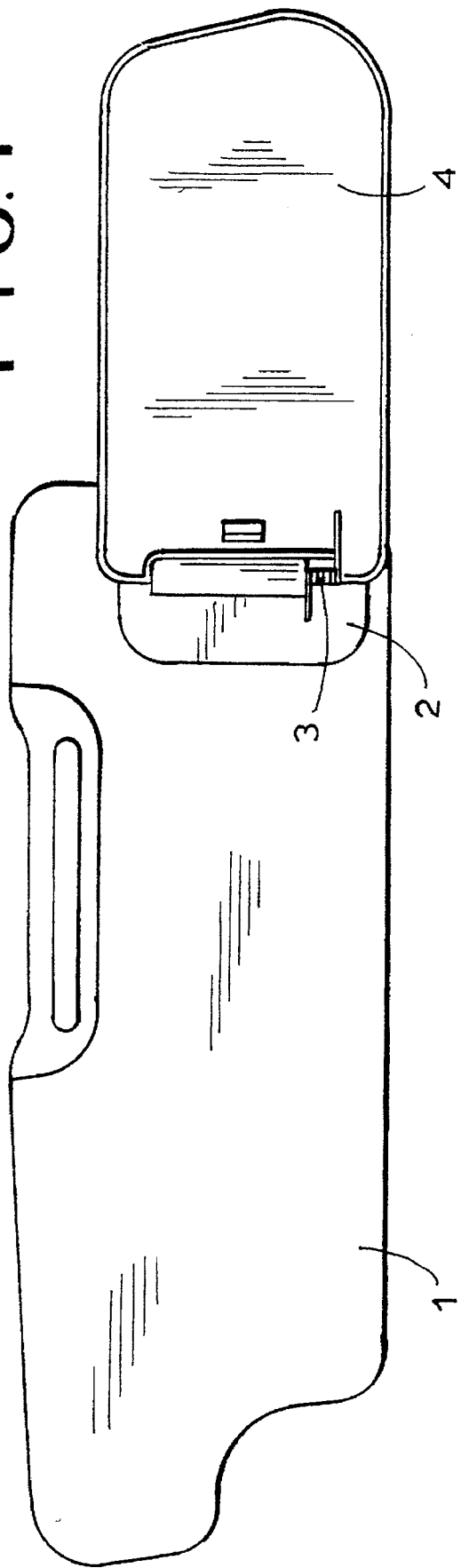

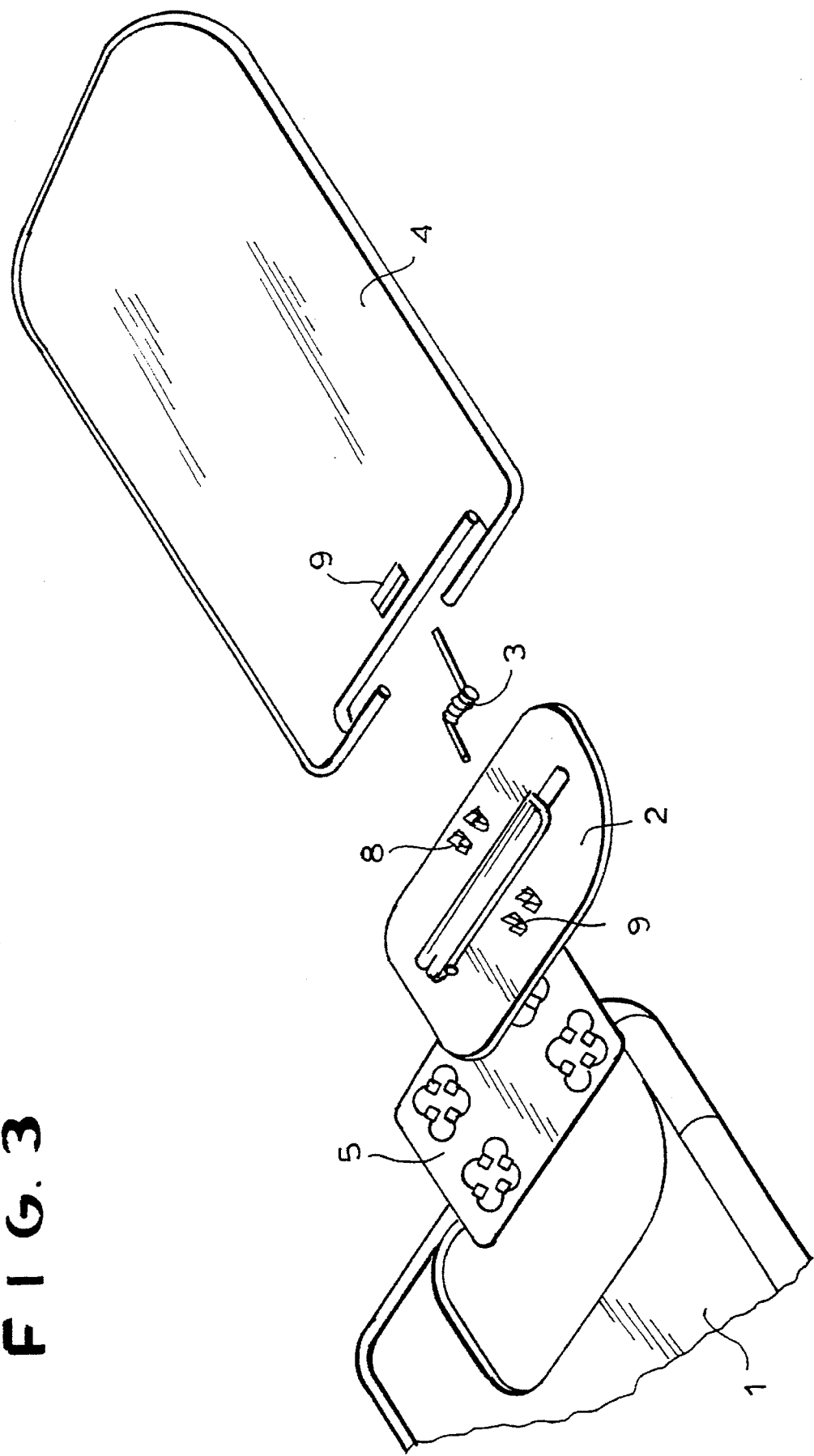

SUN-VISOR FOR MOTOR VEHICLES

BACKGROUND OF THE INVENTION

The present invention relates to a sun-visor for motor vehicles which has a flat, elongated sun-visor body which can be flipped from a position of non-use above the windshield of a car into a position of use in front of the windshield.

Sun-visors for motor vehicles generally have a sun-visor body which is dimensioned so that sufficient protection against glare is obtained when the sun-visor is in its downwardly flipped position of use in front of the windshield. Some sun-visor bodies have additional anti-glare bodies which can be moved over those regions of the windshield that cannot be covered by the sun-visor body. Some additional anti-glare bodies which are articulated by hinges or pivots to the sun-visor bodies are also known for effectively enlarging the sun-visor bodies, for example, as shown in Japanese Patent Publication 62-184925. They additionally cover a part of the side window adjacent the windshield when the sunlight enters the car too strongly from the side.

In practice, problems have arisen during use of sun-visors with sun-visor bodies of normal size. In particular, these occur in convertibles in which locking elements located in the region of the A-columns are to be operated for either closing or release of the convertible top. Sun-visor bodies of normal size may be disturbing here, and they may no longer permit actuation of the locking elements. In order to eliminate this problem, sun-visor bodies which are shortened at one lateral side could be used, but this would create a new problem of insufficient protection against glare.

SUMMARY OF THE INVENTION

The object of the present invention is to remedy the above problem.

The sun-visor according to the invention includes a plate support generally at a longitudinal end region of the sun-visor body. To place the sun-visor body is in its position of use, the plate can be swung open around a hinge in order to provide the sun-visor body with normal size to sufficiently protect against glare. The plate can be swung closed in order to shorten the length of the sun-visor body before it is brought into its position of non-use. The sun-visor body can thus be of normal size and length while in its position of use, yet be of substantially shorter length while in its position of non-use. The normal size of the sun-visor body enables the sun-visor body to sufficiently protect against glare, while the shortened length of the sun-visor body permits unimpeded access to locking elements on the A-columns, or access to the like elements.

The plate of the sun-visor body can preferably be swung between a position of non-use lying parallel to and against the sun-visor body and a use position rotated by 180° around a hinge oriented approximately perpendicular to the flip hinge of the sun-visor body.

To increase operating comfort, a spring arranged in its hinge region supports the swinging-out of the plate.

For simply arranging the plate on the sun-visor body, in a further development of the invention, an insert for attaching a hinge plate is embedded in the sun-visor body. Finally, the hinge plate may have detent elements which cooperate with a detent element on the plate in order to secure the plate in either of the inwardly and outwardly swung positions.

Other features and advantages of the present invention will become apparent from the following description of the invention which refers to the accompanying drawings.

BRIEF DESCRIPTION OF THE DRAWINGS

One embodiment of the invention will be explained in further detail below with reference to the drawing, in which:

FIG. 1 is a view of the sun-visor of the invention in its position of use;

FIG. 2 is a view of the sun-visor of FIG. 1 in its position of non-use; and

FIG. 3 shows the arrangement of the plate on the sun-visor body in an exploded view.

DETAILED DESCRIPTION OF THE INVENTION

The sun-visor comprises a flat, elongated sun-visor body 1 which is fastened by means of a conventional swing hinge (not shown) that surrounds the pivot pin 6. The hinge is located in the region of the upper edge of the windshield. The sun-visor body can be swung from a position of non-use above the windshield (not shown) in the region of the roof of the vehicle into a position of use in front of the windshield. The sun-visor body 1 is of substantially rectangular peripheral shape.

A plate 4 which is pivotally supported by a hinge 7 is disposed at one end of the body 1 in its lengthwise direction. The plate 4 also has a substantially rectangular peripheral shape. The plate 4 can lie in a position parallel to and against the sun-visor body 1, which is at the same time the position of non-use of the sun-visor body 1 shown in FIG. 2. The plate can be swung outward by 180° around the hinge 7 to its open use position shown in FIG. 1. The hinge 7 is oriented approximately perpendicular to the swing hinge of the sun-visor body 1. The sun-visor with the plate 4 in its swung-out position is in the same position of use of the sun-visor body 1 shown in FIG. 1. There the sun-visor body is of a normal size and has a normal length which has proven optimal in actual use.

For attaching the plate 4, the sun-visor body 1 has an insert 5 of sheet metal or plastic which is anchored or embedded in the visor body. The insert 5 includes attachment holes for engagement therein of attachment pins (not shown) which are arranged on the rear of a hinge plate 2. The hinge plate 2 comprises a plastic injection molding. It has a slotted hinge eye for the engagement of hinge pins which are present on one lateral side edge of the plate 4. A torsion spring 3 normally urges the plate 4 into the outwardly swung position. That spring is seated on the longer hinge pin.

The plate 4 can be fastened in either its inwardly or its outwardly swung positions by detent elements 8 formed on the hinge plate 2 at opposite sides of the hinge 7. The elements 8 cooperate with a detent element 9 on the plate 4.

Although the present invention has been described in relation to a particular embodiment thereof, many other variations and modifications and other uses will become apparent to those skilled in the art. It is preferred, therefore, that the present invention be limited not by the specific disclosure herein, but only by the appended claims.

What is claimed is:

1. A sun-visor for a motor vehicle including a flat, elongate sun-visor body including an edge, and means toward the edge of the sun-visor body for supporting the sun-visor body for swinging between a position of non-use above a windshield of the vehicle and a position of use in front of the windshield of the vehicle;

the sun-visor body having opposite lateral ends in the length direction thereof;

a plate for providing glare protection, a hinge means operatively connected to the plate and disposed inward from one of the lateral ends of the visor body, the hinge means enabling the plate to swing outward beyond the lateral end of the visor body to elongate the visor body in the length direction, the hinge means further enabling the plate to swing inward to a position of non-use which shortens the length of the visor body, the hinge means comprising a hinge plate anchored in the sun-visor body, first detent elements on the hinge plate and second detent elements on the plate respectfully positioned for securing the plate in each of its inwardly-swung and outwardly-swung positions by engagement of the respective detent elements on the plate and the hinge plate at each of those orientations.

2. The sun-visor of claim 1, wherein the plate is swingable between its inward position of non-use where it rests extending parallel to and against the sun-visor body and its position of use.

3. The sun-visor of claim 1, wherein the plate is swingable by 180° between the non-use and use positions.

4. The sun-visor of claim 1, further comprising a spring at the sun-visor body and the plate for normally urging the plate to swing to the outward position.

5. The sun-visor of claim 4, wherein the spring is located at the hinge means.

6. The sun-visor of claim 2, further comprising a spring at the sun-visor body and the plate for normally urging the plate to swing to the outward position.

7. The sun-visor of claim 6, wherein the spring is located at the hinge means for supporting the plate to pivot with reference to the sun-visor body.

8. The sun-visor of claim 1, wherein the first detent elements are disposed on the hinge plate and are positioned on both sides of the hinge.

9. The sun-visor of claim 8, wherein the second detent element, disposed on the plate operatively connects with one of the first detent elements when the plate is in its outwardly-swung position and operatively connects with the other of the first detent elements when the plate is in its inwardly-swung position.

10. The sun-visor of claim 9, wherein: the first detent elements comprise at least two oppositely disposed fingers extending outwardly from the plane of the hinge plate;

the second detent element disposed on the plate comprises oppositely disposed indentations which accept the fingers.

11. The sun-visor of claim 1, wherein the hinge plate comprises at least one attachment pin which engages at least one corresponding attachment hole of an insert which is anchored in the sun-visor body.

12. The sun-visor of claim 1, wherein the hinge means further comprises:

pin receiving means for engaging at least one pin of the plate, one of at least one pin of the plate having a torsional spring disposed thereon, the torsional spring having first and second leads extending radially away from the coil of the torsional spring wherein the first and second leads exert a torque on the hinge which tends to force the plate to contact the sun-visor body when the plate is in use.

13. The sun-visor of claim 12, wherein the hinge plate further comprises at least one groove for accepting the first lead of the torsional spring, and wherein the plate comprises at least one groove for accepting the second lead of the torsional spring such that neither of the first and second leads hinders the contact of the plate and the sun-visor body when the plate is in either of its outwardly-swung and inwardly-swung positions.

14. The sun-visor of claim 1, wherein the lateral length of the sun-visor body is shorter than conventional sun-visors to enable the disposal of an element of the car near one lateral end of the sun-visor body when the sun-visor body is in a position of non-use above the windshield of the vehicle, the plate extending the lateral length of the sun-visor body to that of a conventional sun-visor when the sun-visor is in a position of use and the element of the car is no longer proximate to the one end of the sun-visor body.

15. The sun-visor of claim 1, wherein the thickness of the plate is less than about one-half the thickness of the sun-visor body to enable the sun-visor body to achieve a position of non-use above the windshield of the vehicle.

* * * * *